Nov. 11, 1952     T. YOSHII     2,617,226

TWO-PIECE FISHING LURE

Filed Dec. 29, 1950

INVENTOR.
TADAICHI YOSHII
BY
McMorrow, Berman & Davidson
ATTORNEYS

Patented Nov. 11, 1952

2,617,226

UNITED STATES PATENT OFFICE 2,617,226

TWO-PIECE FISHING LURE

Tadaichi Yoshii, Honolulu, Territory of Hawaii

Application December 29, 1950, Serial No. 203,331

2 Claims. (Cl. 43—42.11)

This invention relates to fishing equipment and more particularly to a two-piece lure for attachment to a leader carrying a fishhook.

An object of this invention is to provide a lure having a pair of body sections which are connected together for wobbling movement relative to each other to thereby provide a highly attractive lure for various game fish.

Another object of this invention is to provide a lure including two body sections connected together for wobbling movement relative to each other which is particularly adapted for slidable support on a leader carrying a fishhook.

A further object of this invention is to provide a two-piece lure for attachment to a leader carrying a fishhook which has a chrome plated exterior thereby providing a highly attractive and durable lure body.

A still further object of this invention is to provide a two-piece lure which is adapted to be slidably supported on a leader carrying a fishhook and is relatively simple in structure and cheap to manufacture.

The above and still further objects and advantages of the present invention will become apparent upon consideration of the following detailed description of the invention, when taken in conjunction with the accompanying drawings, wherein.

Figure 1:
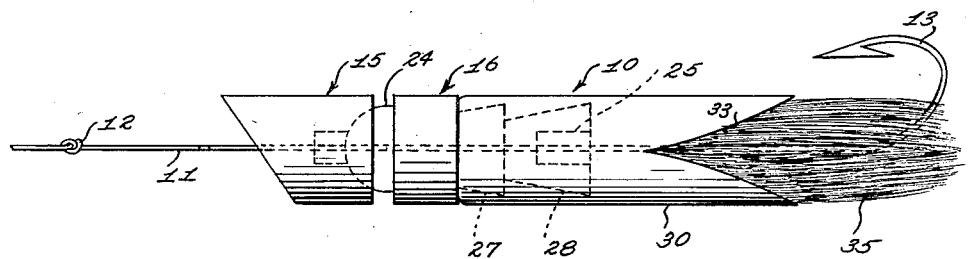
Figure 1 is a side elevational view of the two-piece lure of the present invention shown slidably supported on a leader carrying the fishhook.

Referring now more particularly to the drawings, wherein like reference numerals have been used throughout the several views to designate like parts, there is shown the lure of the present invention, generally designated by the reference numeral 10 slidably supported on a leader 11 having a stop 12 provided contiguous to and spaced from the free end thereof and a hook 13 secured to the free end thereof. It is to be noted that the fishhook 13 includes a stem and a barbed bill secured to one end of the stem, and is arranged so that the other end of the stem is adjacent to the free or one end of the leader 11 and secured to the latter.

Figure 3:
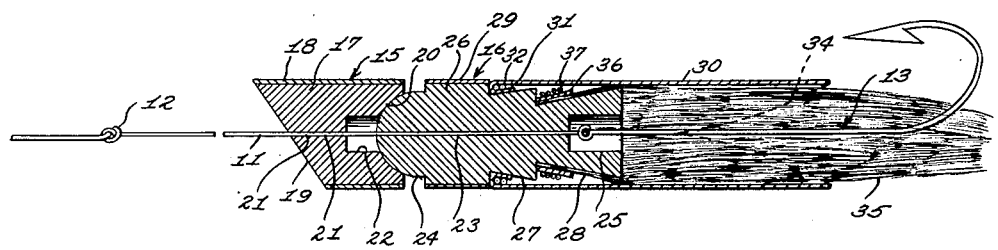
Figure 3 is a longitudinal sectional view of the two-piece lure of the present invention shown supported on the leader carrying the fishhook.
Figure 2:
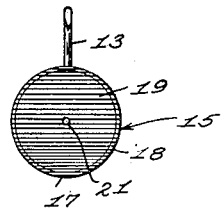
Figure 2 is an end elevational view of the two-piece lure of the present invention, taken from the left of Figure 1.
Figure 4:
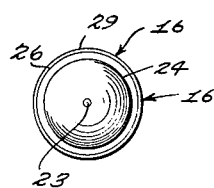
Figure 4 is an end elevational view of the body section of the lure contiguous to the hook, taken from the left of Figure 1.

The lure 10 includes a pair of body sections 15, 16 disposed in end-to-end and confronting relation with respect to each other. The body section 15 includes a wooden cylindrical core 17 and a chrome plated tubular cover 18 circumposed about the core 17 and secured thereto. The end face of the body section 15 contiguous to the stop 12 is angularly cut away to form a forwardly facing water disturbing face 19 which materially increases the surface disturbance. The body section 15 is provided with an arcuate socket 20 in the confronting end thereof, the body section being further provided with a longitudinally extending leader receiving bore 21. As clearly shown in Figure 3 the body section 15 is provided with a line clearance counter bore 22 which extends inwardly from the socket 20 and terminates at a point contiguous to and spaced from the water disturbing face 19.

The body section 16 is provided with a longitudinally extending leader receiving bore 23, the confronting end of the body section 16 being formed with a ball 24 seated in the socket 20 and mounting the sections 15, 16 for wobbling movement relative to each other. The non-confronting end of the body section 16 is provided with an inwardly extending hook shank receiving counter bore 25. Body section 16 includes a cylindrical core 26, the periphery of the core being provided with a pair of longitudinally spaced tapering annular shoulders 27, 28. As clearly illustrated in Figure 3 the tapering annular shoulder 27 is arranged substantially intermediate the ends of the core 26 and the tapering annular shoulder 28 is arranged contiguous to the non-confronting end thereof. Circumposed about the core 26 intermediate the ball 24 and the tapering annular shoulder 27 is a chrome plated tubular cover 29 which is secured to the adjacent peripheral portions of the core.

Disposed longitudinally of the body section 16 is a tubular tail section 30 which is fabricated of any suitable flexible material such as plastic and has one end secured to the section 16 and has the other end projecting rearwardly thereof. As clearly illustrated in Figure 3 the end of the tail section 30 circumposed about the body section 16 is turned back upon itself as indicated by the reference numeral 31 and secured to the tapering shoulder 27 by means of the tie cords 32. It is to be noted that the tubular tail section 30 substantially forms a continuation of the tubular chrome plated cover 29. The rearwardly projecting end of the tail section 30 is provided with a pair of opposed inwardly extending V-shaped notches 33, 34 which subdivide the tail section 30.

Arranged within the flexible tail section 30 is a feathered bucktail 35 which has one end secured to the body section 16 and has the other end projecting exteriorly of the tail section 30. As clearly shown in Figure 3 the quill end of the bucktail 35 overlies and extends longitudinally of the tapering shoulder 28 and is secured thereto by means of the adhesive tape 36 which is wrapped around the shoulder 28 and the tie cords 37 which are wrapped around the adhesive tape 36.

In actual use the knob or stop 12 is spaced approximately twenty-four inches from the free end of the leader 11 thus permitting the lure to tend to run up the leader 11 leaving only the hook 13 in the fish and thereby preventing damage to the lure after the strike.

The ball and socket joint permits wobbling or universal movement of the body sections 15, 16 relative to each other thereby giving the lure greater attractive powers and a very highly desirable action. The water disturbing face 19 is cut at approximately an angle of 55 degrees and provides greater surface disturbance, the ball and socket joint reducing the spinning tendencies of the lure to a minimum. The hook receiving bore 25 in the body section 16 assures a proper hook receiving movement and the leader clearance counterbore 22 prevents kinking of the leader contiguous to the ball and socket joint.

Although only one embodiment of the two-piece lure of the present invention has been described, it is readily apparent that numerous modifications can be made without departing from the spirit of the invention as set forth in the appended claims.

What I claim is:

1. The combination with a leader, a fishhook including a stem and a barbed bill secured to one end of said stem arranged so that the other end of said stem is adjacent to the one end of said leader and secured to the latter, and a stop on said leader inwardly of said one end of the latter, of a lure embodying a pair of solid body sections arranged in end to end relation with respect to each other circumposed about and slidably supported on said leader intermediate said stop and said one end of said leader, interengaging ball and socket means on the confronting ends of said sections mounting same for wobbling movement relative to each other, a chrome plated tubular cover circumposed about each of said sections, the non-confronting end of one of said body sections contiguous to said one end of said leader being provided with a counterbore extending inwardly thereof and receiving the other end of said stem and said one end of said leader, a flexible tubular tail section disposed longitudinally of said one of said body sections and surrounding said fishhook stem and having one end secured to the non-confronting end of said one of said body sections by means of tie cords and having the other end projecting rearwardly therefrom, said one end of said tail section being turned inwardly and receiving the tie cords within the inwardly turned portion, said tail section and the adjacent tubular cover together having a peripheral effect of being substantially a continuation of each other, and a feathered buck tail arranged within said tail section and covering the adjacent portion of said fishhook stem and having one end secured to the non-confronting end of said one of said body sections and having the other end projecting from and beyond said tail section.

2. The combination with a leader, a fishhook including a stem and a barbed bill secured to one end of said stem arranged so that the other end of said stem is adjacent to the one end of said leader and secured to the latter, and a stop on said leader inwardly of said one end of the latter, of a lure embodying a pair of solid body sections arranged in end to end relation with respect to each other circumposed about and slidably supported on said leader intermediate said stop and said one end of said leader, interengaging ball and socket means on the confronting ends of said sections mounting same for wobbling movement relative to each other, a chrome plated tubular cover circumposed about each of said sections, the non-confronting end of one of said body sections contiguous to said one end of said leader being provided with a counterbore extending inwardly thereof and receiving the other end of said stem and said one end of said leader, a flexible tubular tail section disposed longitudinally of said one of said body sections and surrounding said fishhook stem and having one end secured to the non-confronting end of said one of said body sections by means of tie cords and having the other end projecting rearwardly therefrom, said one end of said tail section being turned inwardly and receiving the tie cords within the inwardly turned portion, said tail section and the adjacent tubular cover together having a peripheral effect of being substantially a continuation of each other, and a feathered buck tail arranged within said tail section and covering the adjacent portion of said fishhook stem and having one end secured to the non-confronting end of said one of said body sections and having the other end projecting from and beyond said tail section, the non-confronting end of the other of said body sections contiguous to said leader stop being angularly cut away to form a forwardly facing water disturbing face.

TADAICHI YOSHII.

REFERENCES CITED

The following references are of record in the file of this patent:

UNITED STATES PATENTS

| Number | Name | Date |
|---|---|---|
| 1,582,713 | Welch | Apr. 27, 1926 |
| 1,688,110 | Bogart | Oct. 16, 1928 |
| 2,233,684 | Strite | Mar. 4, 1941 |
| 2,498,800 | Fehely | Feb. 28, 1950 |

FOREIGN PATENTS

| Number | Country | Date |
|---|---|---|
| 148,194 | Austria | Dec. 28, 1936 |
| 788,830 | France | Oct. 18, 1935 |